United States Patent [19]
Nugent

[11] Patent Number: 6,076,131
[45] Date of Patent: Jun. 13, 2000

[54] ROUTING RESOURCE RESERVE/RELEASE PROTOCOL FOR MULTI-PROCESSOR COMPUTER SYSTEMS

[75] Inventor: Steven F. Nugent, Portland, Oreg.

[73] Assignee: Intel Corporation, Santa Clara, Calif.

[21] Appl. No.: 08/811,815

[22] Filed: Mar. 4, 1997

Related U.S. Application Data

[63] Continuation of application No. 08/498,457, Jul. 5, 1995, abandoned, which is a continuation of application No. 07/998,534, Dec. 30, 1992, abandoned.

[51] Int. Cl.$^7$ ................................................ H04L 12/66
[52] U.S. Cl. ........................... 710/131; 709/238; 370/354
[58] Field of Search ........................... 710/131; 370/406, 370/408, 400, 352–356; 426/506; 709/232, 235, 238, 239, 242, 250; 714/4

[56] References Cited

U.S. PATENT DOCUMENTS

| | | |
|---|---|---|
| 4,598,400 | 7/1986 | Hillis . |
| 4,773,067 | 9/1988 | Duxbury et al . |
| 5,008,882 | 4/1991 | Peterson et al. ................... 370/94.3 |
| 5,093,827 | 3/1992 | Franklin et al. ................... 370/60.1 |
| 5,165,023 | 11/1992 | Gifford ................................ 395/325 |

OTHER PUBLICATIONS

William Stallings, *Data and Computer Communications,* (1998–2$^{nd}$ Edition) New York: MacMillan Publishing Co–Chapters 4 & 5.

*Primary Examiner*—Paul R. Myers
*Attorney, Agent, or Firm*—Blakely, Sokoloff, Taylor & Zafman LLP

[57] ABSTRACT

A method and apparatus for reserving and releasing routing paths in a parallel processing computer system. The present invention eliminates the need to restart the computer system to recover from a system seizure or an application stall. A plurality of signals are provided which convey various message transmission information to source, intermediate and destination nodes and routing elements. A first signal is used by a source node to reserve a route to a destination node. A second signal is used by the destination node to indicate that the message has reached the destination node and later that the entire message has been transmitted. A third signal is used by the destination node to signal that an error in transmission has been detected. Through various combinations of the signals transmission information is obtained and nodes in the route may be reserved and released.

12 Claims, 13 Drawing Sheets

ROUTING RESOURCE RESERVE/RELEASE PROTOCOL FOR MULTI-PROCESSOR COMPUTER SYSTEMS

This is a continuation of application Ser. No. 08/498,457, filed Jul. 5, 1995, now abandoned, which is a continuation of application Ser. No. 07/998,534, filed Dec. 30, 1992, now abndoned.

BACKGROUND OF THE INVENTION

1. Field of the Invention

The present invention relates to the field of parallel processing computer systems, in particular the routing of message packets between processors in such a computer system.

2. Prior Art

Parallel processing computer systems are well known in the prior art. Generally, in such systems a large number of processing nodes are interconnected in a network. In such networks, each of the processors may execute instructions in parallel. Parallel processing computer systems may be divided into two categories; (1) a single instruction stream, multiple data stream system (SIMD) and (2) a multiple instruction stream, multiple data system stream (MIMD) system. In an SIMD system each of the plurality of processors simultaneously executes the same instruction on different data. In MIMD system, each of the plurality of processors may simultaneously execute a different instruction on different data.

One way for interconnecting processing nodes is in a mesh topology. FIG. 1 is a block diagram which illustrates a mesh network topology of a parallel processing computer. Referring to FIG. 1, the processing nodes are arranged in a 2×3 mesh consisting of rows and columns. Each node is coupled to two (2) or three (3) neighboring nodes via routing elements (not illustrated). For example, the node A 101 is coupled to the node D 104 and node B 102. Further, the node E 105 is coupled to the node D 104, node B 102 and node F 106. Note that these couplings allow a node to couple to another node by going through one or more intermediate nodes. For example, the node D 104 may transmit a message to the node C 103 via node E 105 and node F 106.

A known hazard of such parallel processing systems is mesh (or network) seizure. Mesh seizure occurs when certain errors are encountered from which the computer system cannot recover. For example, the mesh seizes because channel(s) were opened and never closed. Mesh seizure refers to a condition where the mesh network enters a state where no progress can be made in furthering the computing process. This typically occurs because of a failure in the mesh network resulting in one or more routing paths to be rendered useless.

A second hazard is the potential for an application stall. Application stalls refer to a condition where an application cannot continue execution because of corruption in the data being received. An application stalls because it received corrupted data or a message was misrouted and never arrived.

Mesh seizures are somewhat more catastrophic than application stalls since a seizure can and will lock up the entire machine. Currently, the only way to recover from a mesh seizure is to restart execution of the entire computer system. For an application stall, only the particular application need be restarted.

It has been determined that mesh seizures and application stalls result from some error occurring during the routing of a message. The errors that may occur are:

1. The "hardware" routing header is corrupted.

In this case the message would be misrouted to the wrong node or to a non-existent node.

If it is routed to a non-existent node, the current hardware will "bit-bucket" the message off the network to prevent seizure and will set an error flag indicating that a misroute took place at a particular port. This flag may be handled by the corresponding node or the diagnostic node. There is no information saved as to which message was lost or its source and destination. The application that lost this message will probably stall and eventually time-out.

If the message is routed to the wrong node, this node may not be able to deal with an unsolicited message and this may stall the application on that node as well as the node that is waiting for the misrouted message. To recover form both of these types of errors, the system is typically restarted.

2. The body of the message is corrupted.

In this case an error is reported to the destination node. The application will stall if a copy of the message is not retained at the source node. To recover from this error, the system is typically restarted.

3. The "hardware" tail of the message is corrupted.

In this case the channel(s) that were reserved during routing are not released. A single bit (no redundancy) in each message defines the tail. If the tail is dropped along the route, channels will not be released. This creates the possibility of path "fragments" or segments that are left reserved indefinitely. This is the most catastrophic of errors with no software recovery possible. The mesh will "seize" and ultimately block message access to all nodes. To recover from this error, the system is restarted.

FIG. 2 illustrates a network failure resulting from a tail bit being dropped. Referring to FIG. 2 a message is being transmitted from source routing element 201 through destination routing element 206. The message would be transmitted through element 202, 203, 204 and 205. Note that at routing element 203 the tail bit has dropped off. The tail bit may have dropped off due to a transmission error, or as a result of a processing error. At this point, there is no indication that the message transmission has been complete. Thus, none of the remaining routing elements 203 through 206 will get an indication that the message has terminated and will remain in a state where they are waiting for the tail bit to be presented so that they release routing resources to allow the routing of other messages.

FIG. 3 illustrates a network failure resulting from a header being stopped. Referring to FIG. 3 a message originating from source routing element 301 is going to destination element 306. At routing element 303 the header information has been somehow corrupted. Note that up to that point the elements 301 and 302 are reserved for transmitting of this message. However the destination routing 306 never receives the message. Thus, the routing elements 301 and 302 remain in a state where routing resources are reserved indefinitely. As described above, in both the tail bit being dropped and header being stopped, the only way to recover from such an error is to restart the entire computer system. This is because other messages will require the use of the routing resources that will never be released to them. This can ultimately deadlock most messages in the network and they cannot make progress.

SUMMARY

A method and apparatus for reserving and releasing routing paths in a parallel processing computer system, is disclosed. The present invention provides a means by which orderly recovery can be made from network message transmission failures. In the present invention a computing node asserts and de-asserts signals to reserve and release routes in a routing element. A message is sent by a source node for receipt by a destination node. A first signal is used by a source node to reserve a route to a destination node. A second signal is used by the destination node to indicate that the message has reached the destination node and later that the entire message has been transmitted. A third signal is used by the destination node to signal that an error in transmission has been detected.

In operation, the source node will assert the first signal upon transmission of a message. Upon detection of the first signal, routing elements will reserve the route for transmission of the message. When the destination nodes receives the beginning of the transmitted message, the destination node will assert the second signal. This assertion of the second signal may be used by the source node as information that the message has reached the destination node. When the entire message has been received, the destination node will de-assert the second signal. This de-assertion may be used by the source node as information that the entire message has been received by the destination node. Responsive to the de-assertion, the source node will de-assert the first signal. Upon detection of the de-assertion, the routing elements would release the route. However, the routing elements will only release the route if both the first signal and second signal are not asserted.

The destination node may assert the third signal if an error in the received data is detected. If the third signal is asserted, the source node will be informed that a data transmission error has occurred. The source node may then take appropriate action, such as re-transmitting the message. The destination node will continue to assert the third signal until the source node has de-asserted the first signal.

DETAILED DESCRIPTION OF THE PREFERRED EMBODIMENT

A method and apparatus for routing messages in a parallel processor computer system, is described. In the following description, numerous specific details, e.g. message formats, are set forth in order to provide a thorough understanding of the present invention. It will be apparent, however, to one skilled in the art that the present invention may be practiced without such specific details. In other instances, specific implementation details, such as error handling routines, have not been shown in detail in order not to unnecessarily obscure the present invention.

The present invention is used in connection with an existing routing element to insure the integrity of passed messages and to avoid mesh seizures or application stalls. The requirement of restarting the entire computer system responsive to a mesh seizure or application stall is extreme. As the type of applications that run on the parallel processor of the currently preferred embodiment are long running and very compute intensive, the need to restart the computer system must be avoided whenever possible.

Parallel Processing Computer System of the Currently Preferred Embodiment

Figure 4:
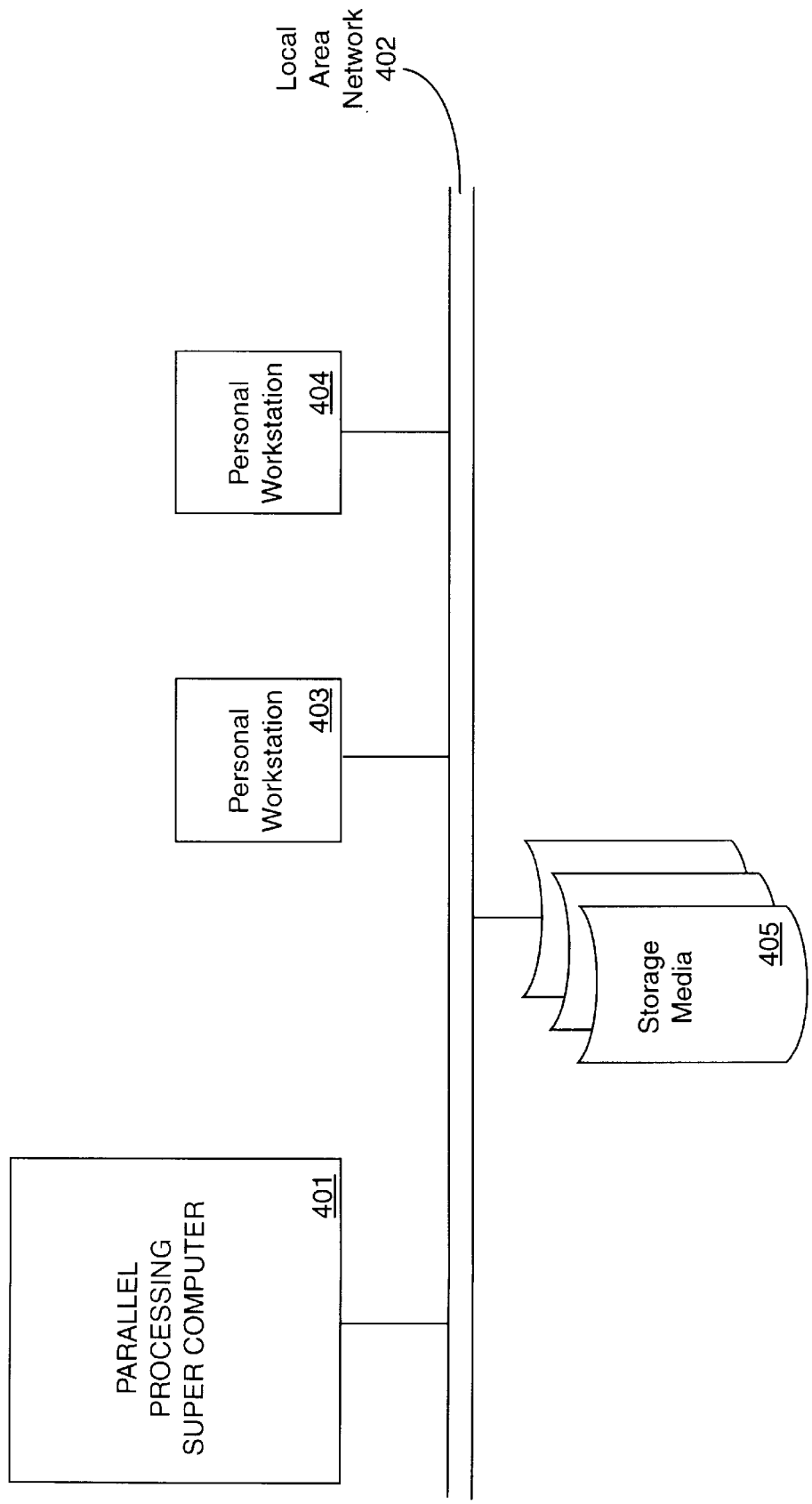
FIG. 4 is a block diagram of the computer environment utilizing a parallel processing super computer if the present invention may be embodied.

FIG. 4 is a block diagram of a computing environment utilizing a parallel processing super computer as may be utilized in the currently preferred embodiment of the present invention. Referring to FIG. 4 a parallel processing super computer 401 is coupled to a local area network (LAN) 402. Further coupled to local area network 402 are personal workstations 403 and 404 and storage media 405. The parallel processing super computer 401 performs processing services for users on a local area network 402, e.g. users on personal workstations 403 and 404. The personal workstations 403 and 404 may be any UNIX-compatible workstation (UNIX is a trademark of AT&T Corporation). The storage media 405 contains program data which would execute on the parallel processing super computer 401. The local area network 402 may be one of various known LAN topologies, e.g. ethernet or token ring.

The parallel processing super computer 401 of the currently preferred embodiment is an Intel Paragon processor available from the Intel Corporation of Beaverton, Oreg. A parallel processing super computer such as the Paragon is made up of a plurality of independent processing nodes that are interconnected via a network of routing elements. The manner in which messages are transmitted between the nodes will be discussed in greater detail below.

The computing nodes of a parallel processor are comprised of a processor and a Network Interface Chip (NIC) component. The processor may be a general purpose microprocessor, e.g. the Intel486™ family of microprocessors, or a specifically designed microprocessor, e.g. the i860 and i960 processors, all of which are available from the Intel Corporation of Santa Clara, Calif. The NIC component is used to couple the node to the routing element. The NIC component buffers incoming and outgoing messages for the processor. As will be described in more detail below, in the currently preferred embodiment, the NIC component will be the source of various signals provided for in the present invention.

The routing element is specifically designed to implement a particular routing architecture. As noted above, the architecture of the preferred Paragon system is a mesh architecture. The routing element of the currently preferred embodiment is termed a Mesh Routing Chip (MRC). The present invention is preferably implemented within the NIC component and the MRC.

Information is transmitted between the nodes in units called messages (or packets). It is useful at this point to describe the format for a message.

Message Format

Figure 5:
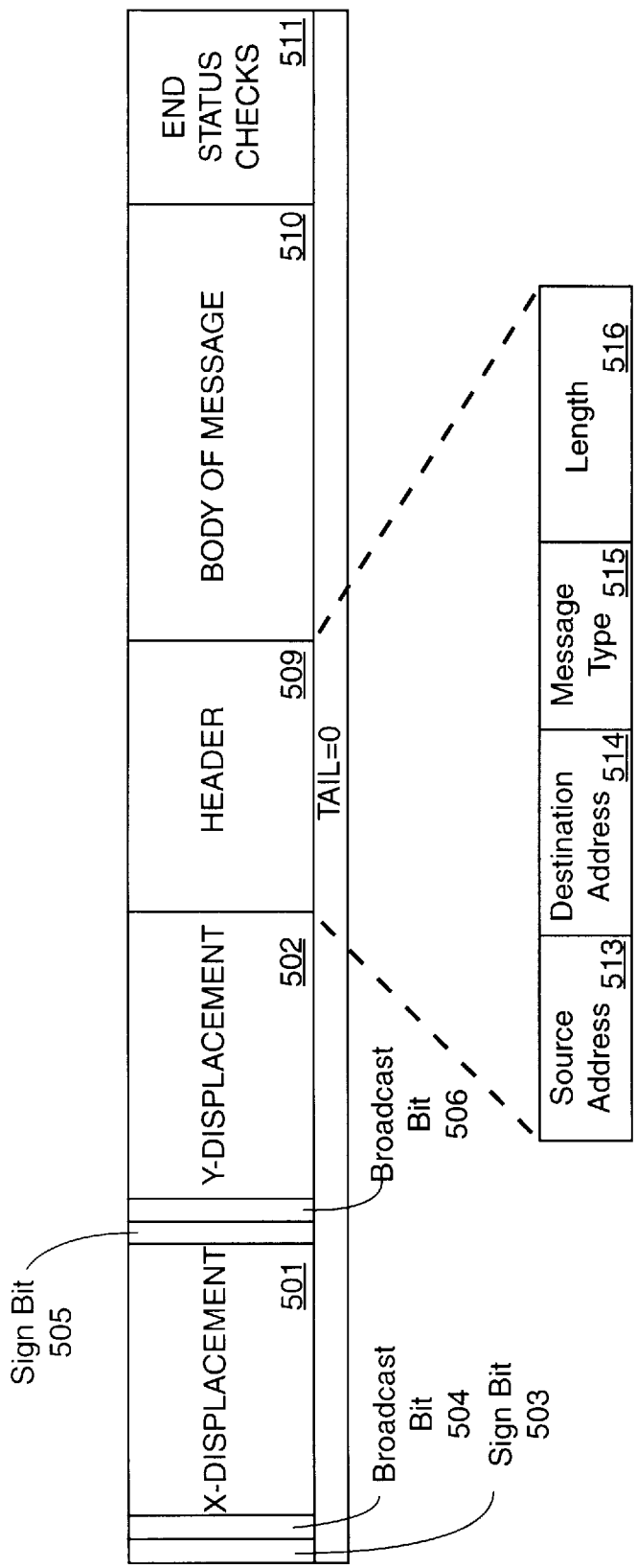
FIG. 5 illustrates the message format for messages being transmitted in the mesh architecture of the currently preferred embodiment of the present invention.

The message format used in the currently preferred embodiment of the present invention is described with reference to FIG. 5. The first two fields of the message format contain an X displacement 501 and Y displacement 502. The X displacement 501 and Y displacement 502 contain the displacements of the destination node with respect to the source node. Each of the fields 501 and 502 further comprise a sign bit 503 and 505 respectively and a broadcast bit 504 and 506 respectively. The sign bits 503 and 505 indicate the direction in which the displacement occurs. For example, if a source node is at location (4, 3) in the mesh and a destination node is at location (2, 6) in the mesh, the X displacement will be a negative 2 and the Y displacement would be a positive 3. The broadcast bits 504 and 506 provide for transmitting the message across an entire row or column. The tail bit 512 when having a predetermined value, typically a logical 1 value, signals the end of the transmission. As will become apparent, utilization of the present invention would allow the elimination of the tail bit signal.

The format further includes a header 509, the body of message 510, various status check fields 511 and tail bit 512. The header 509 contains various information concerning the message. Such information includes source address 513, destination address 514, message type 515 and message length 516. The body of the message is the data intended to be transmitted. The status checks 511 include a cyclical redundancy character and other error detection means. Finally, the entire message packet ends with a tail bit 512 that is set to one. Note that during normal operation, the only tail bit that will have a one value would be the final tail bit, here tail bit 512. A tail bit in any other area would cause the end of transmitting the message.

The Routing Element of the Currently Preferred Embodiment of the Present Invention As noted above the routing element of the currently preferred embodiment is implemented in an MRC. The MRC routes messages to neighboring the nodes in the mesh and ultimately to the destination node. The routing scheme used is to first route through nodes across the X dimension and then route through nodes across the Y dimension. In the currently preferred embodiment there is only one path between two nodes. However, as will become apparent the present invention may be utilized in adaptive routing schemes.

Figure 6:
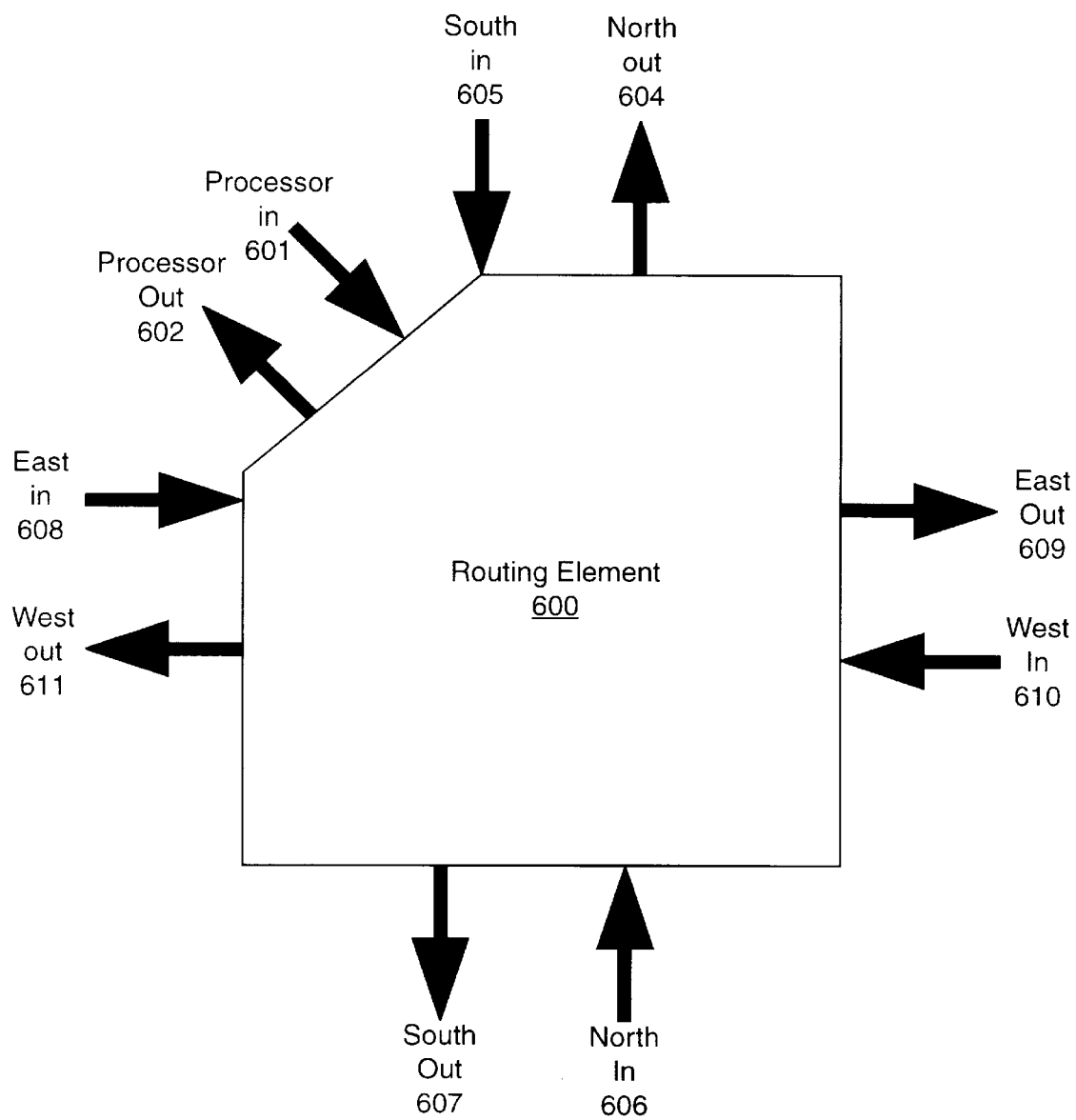
FIG. 6 illustrates the couplings for a routing element of the currently preferred embodiment of the present invention.

FIG. 6 illustrates the inputs and outputs of a routing element. Referring to FIG. 6, routing element 600 couples to the processor element via processor in 601 and processor out 602. The processor in 601 and processor out 602 are coupled to the NIC component of a processor element. The processor in 601 is used to transmit messages from the processor to other nodes in the mesh network. The processor out 602 is used to send messages to the processing element that were received from other nodes in the mesh network. The remaining connections on the routing element 600 are named according to the direction in which a message will be transmitted. So for a signal that will be traveling north in the network (i.e. along the Y-axis) it will enter the routing element 600 through north in 606 and exit via north out 604. Similarly if a message was being routed to a node that was below the routing element 600 it would enter through south in 605 and exit through south out 607. The same hold true for messages being transmitted in the east/west direction (i.e. along the X-axis), namely that a message traveling west will enter west in 610 and exit west out 611 and a message going east will enter east in 608 and exit east out 609.

Figure 1:
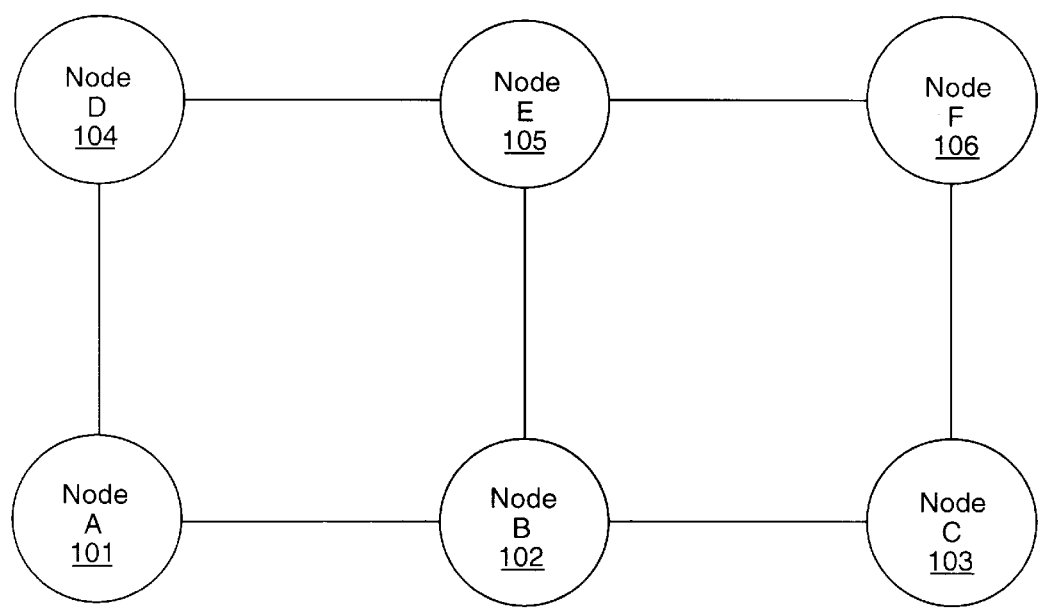
FIG. 1 is a diagram illustrating a 2×3 mesh topography of a parallel processor of the currently preferred embodiment of the present invention.
Figure 2:
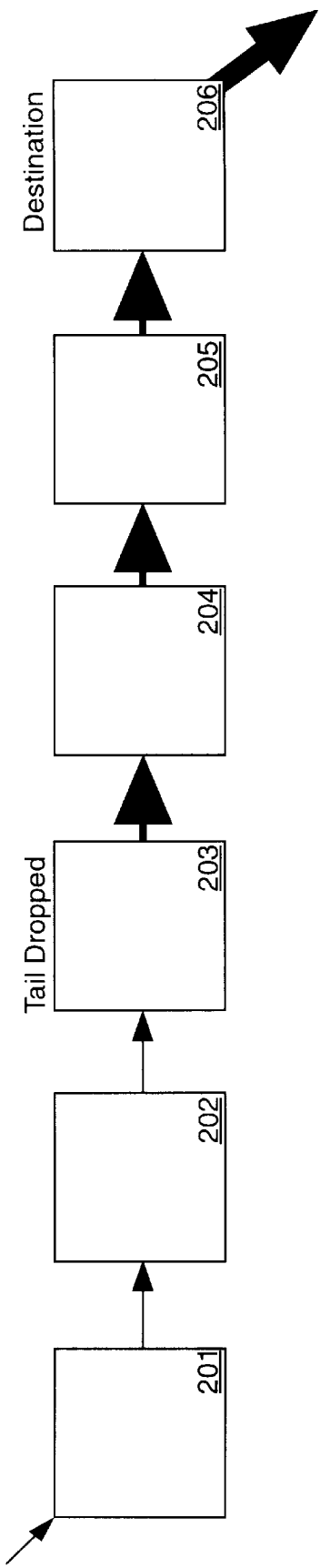
FIG. 2 illustrates an error resulting from the dropping of a tail bit that would result in a mesh seizure.
Figure 3:
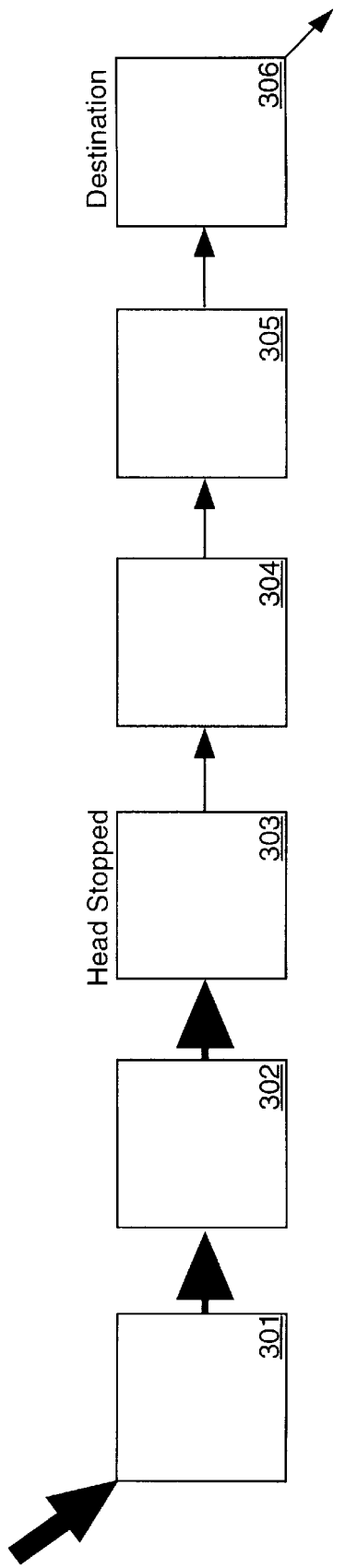
FIG. 3 illustrates an error resulting from corruption of a message header that would cause an application stall.

It should be noted that for the routing element 600 boundary nodes will not have connections to nodes in all directions for example, referring briefly to FIG. 1 the node A 101 does not have a node to the west or a node to the south. Accordingly, the routing element 600 for a node A 101 would not use the signals north in 606, south out 607, east in 608 or west out 611.

Figure 7:
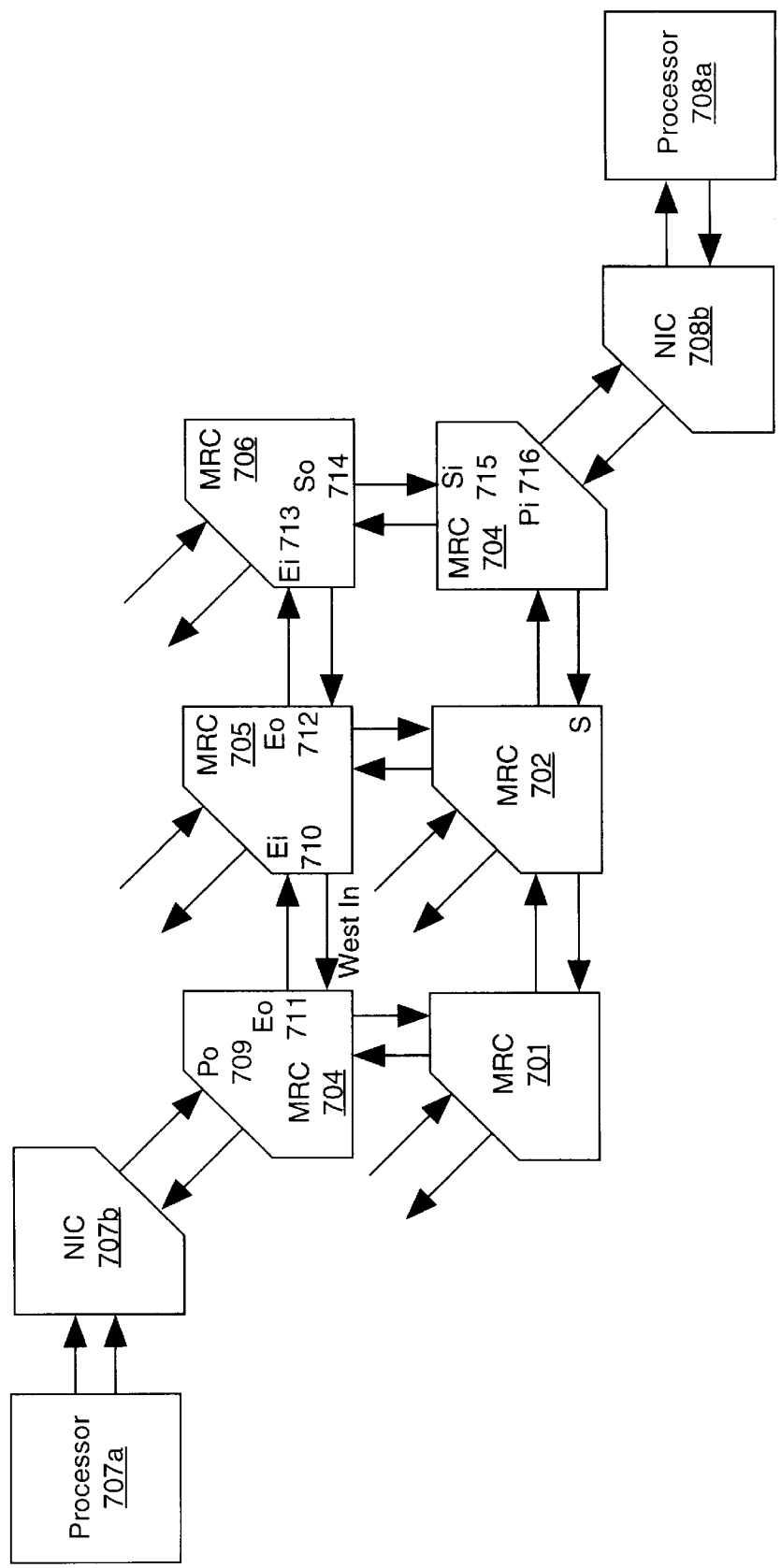
FIG. 7 illustrates the routing elements in a mesh for a parallel processing computer having the 2×3 mesh topology of FIG. 1.

FIG. 7 illustrates the coupling of the MRCs for a parallel processing computer system having the mesh architecture described in FIG. 1. MRCs 701–706 define the routing elements for the mesh architecture. An example describing the transmission of a message from a processor 707a to a processor 708a will aid in describing the routing. Referring to FIG. 7, a processor 707a is coupled to a NIC 707b and a processor 708a is coupled to a NIC 708b. First, the message from processor 707a would exit NIC 707b and enter MRC 704 via processor Out (Po) 709. As described above, the currently preferred embodiment utilizes a routing scheme where the horizontal distance is traversed first. Thus, the message would exit MRC 704 heading east via east out (Eo) 710. East out 710 is coupled to east in (Ei) 711 of MRC 705. The message would then be transmitted to the east in 711 of MRC 705. As the Processor 708a is still to the east of MRC 705, the message would exit the east out (Eo) 712 of MRC 705. During the transmission of the message, the route from east in 711 to east out 712 is reserved. The protocol of the present invention for reserving and releasing of routes is described in greater detail below.

The east out (Eo) 712 of MRC 705 is coupled to the east in (Ei) 713 of MRC 706. At MRC 706 the message would enter east in (Ei) 713. Here, the processor 708a is now to the south. Thus, the message would exit at south out (So) 714. During the transmission of the message, at MRC 706, the route from east in (Ei) 713 to south out (So) 714 would be reserved.

The south out (So) 714 is coupled to the south in (Si) 715 of MRC 703. The message would enter south in (Si) 715 of MRC 703. The message would then be transferred to NIC 708b via processor out (Po) 716.

Figure 8:
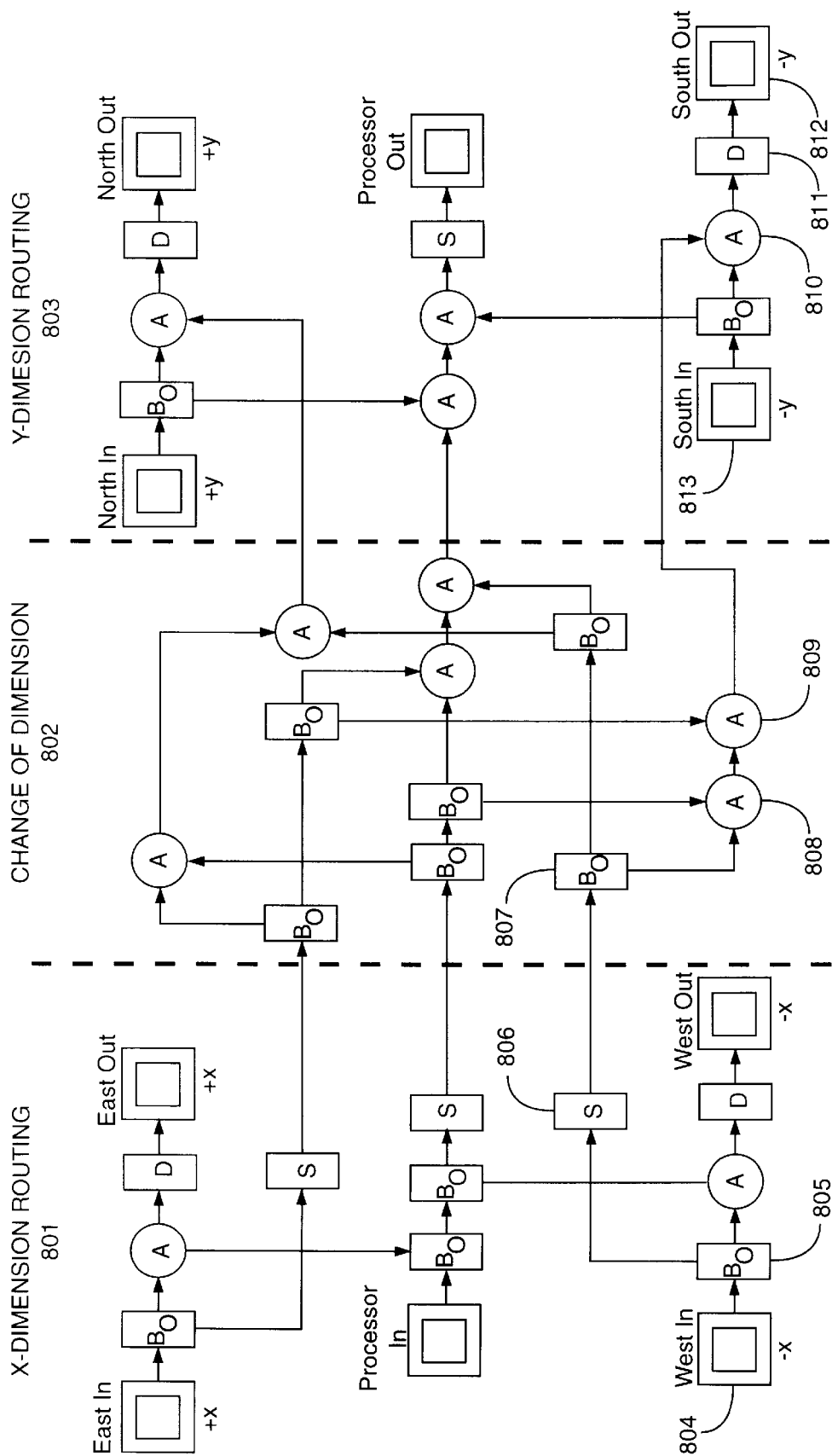
FIG. 8 is a block diagram of a prior art routing element.

FIG. 8 is a block diagram of the functionality within a prior art MRC. This prior art block diagram may be used to describe a MRC of the currently preferred embodiment. Changes would be made at the channel signal level. In any event, the MRC is divided into three functional areas, X dimension routing 801, change of dimension 802 and Y dimension routing 803. The X dimension routing provides for routing messages in the X or east/west direction. The Y dimension routing is used to route messages in the Y or north/south directions. The change of dimension 802 is used to route messages from the X dimension to the Y dimension. As noted above, the routing scheme of the currently preferred embodiment of the present invention first runs across the X dimension before routing in the Y direction. The following nomenclature is used in FIG. 8:

B=Broadcast cell. A broadcast cell includes a selector which allows a message to select one of two paths or both paths. Both paths are selected if the broadcast bit is set. If not set, the path choice is based upon whether the displacement of the first word is zero or non-zero. Paths in the routing elements are reserved by the broadcast cell selector.

A=Arbiter cell. An arbiter cell includes a selector which allows only one of two messages to use a channel at a time. The arbitration is such that if one incoming channel has control of the outgoing channel and the other incoming channel requests that outgoing channel, the waiting request will be granted when the prior message transmission is completed. In the prior embodiments, this occurs when the tail bit of the current message has passed. As will be described in more detail below, in the currently preferred embodiment of the present invention, this will be after the entire message has been received by the destination node, or a time out condition has occurred. In the event that two requests occur simultaneously, the arbiter cell will not grant either request until any possible metastability problems have been resolved.

D=Decrementor cell. A decrementor cell will decrement the first word of each message which passes through it.

S=Stripper cell. A Stripper cell will strip the first word off of each message which passes through it.

Each of the channel routes operate in the same fashion. Thus, the operation will be described with respect to an example. Assuming that the source node is at (X, Y) location of (2,1) and the destination node is at (1,0) the message will enter the MRC through the west in 804. The message will first enter a broadcast cell 805. Assume at this point there is no broadcast, (i.e. the broadcast bit is not set). Because the X displacement is zero and the broadcast bit is not set, the message packet will be transmitted to stripper cell 806. In this instance, the stripper cell 806 will remove the first word off the message, which is the X displacement information. The x-displacement information is no longer need because it is equal to zero. The message is then transmitted to a broadcast cell 807. In this broadcast cell it will be determined whether there will be broadcasting along the Y dimension. Again assume that there is no broadcasting along the Y dimension (i.e. the broadcast bit is not set). But this time the Y displacement is non-zero. Because there is still Y-dimension routing to be done, the message is then transmitted to arbiter cells 808 and 809. In the arbiter cells 808 and 809 an arbitration scheme is used to allow the message to be transmitted when the desired channel is free. After the arbiter cell 809, the final arbiter cell 810 is entered. The arbiter cell 810 monitors the use of the south out port with respect to a south in input 813. Once the message is ready to be transmitted it goes through a decrementer cell 811 where the Y dimension displacement is decremented. Finally the message exits the MRC through the output south out 812.

Signals

Figure 9:
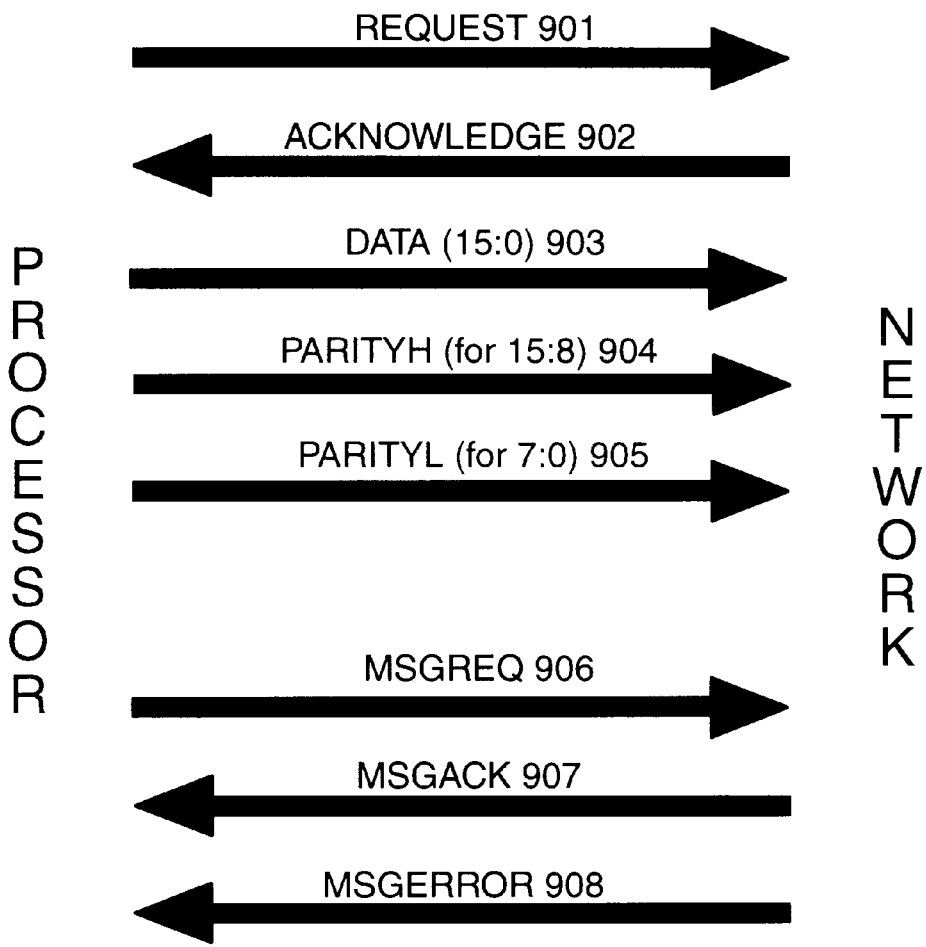
FIG. 9 illustrates the channel signals for a path in a routing element as may be utilized in the currently preferred embodiment of the present invention.

FIG. 9 illustrates the channel signals of the currently preferred embodiment of the present invention. In the currently preferred embodiment, the new signals, MSGREQ, MSGACK and MSGERROR are generated in the NIC. In FIG. 9, the direction of the arrow head denotes whether a message is incoming or outgoing. By incoming it is meant that the signal is coming into a processor. By outgoing it is meant that the signal is leaving from a source processor into the network (to ultimately be routed to a destination processor.) Referring to FIG. 9 the signals 901 through 905 are found in the prior art MRC. Briefly, these signals are the request signal 901, the acknowledge signal 902, data signals 903, the high parity signal 904 and a low parity signal 905. The signals 901–905 effectively comprise a link level handshake protocol. The signals that are added are signals MSGREQ 906, MSGACK 907 and a MSGERROR 908. The signals 906–908 effectively comprise a transport level protocol.

The transport level hardware protocol is much like the link level protocol except that the handshakes are acknowledging message packets. The transport level protocol is also more robust than the link level. This is because the link level protocol signals have no state stored along the route and therefore are less prone to noise influences.

The request signal 901 is used to validate the bit cell time for each bit word. This allows a receiving node to know when the data signals 903 will contain valid data. The acknowledge signal 902 is used to indicate the consumption of a word of data and that another may be sent. The data signals 903 are used to transmit the contents of the message. The parity signals 904 and 905 are use for error checking of the transmitted data.

As noted above, the signals MSGREQ 906 and MSGACK 907 are added. With these signals, the tail bit is no longer used to signal the end of a message. Both of these signals are "level-sensitive" as opposed to REQUEST and ACKNOWLEDGE which are "edge-sensitive". This means that the MRCs will react to the level of the signal, not just the edge. These signals provide the basis for an end-to-end transport level protocol for message packets. A third signal used is MSGERROR 908. MSGERROR is used to relate message transmission errors back to a source node.

MSGREQ is used to open the path. MSGREQ is routed from the source node to the destination node along with the message packet. MSGREQ originates at the source NIC. It allows initial channel reservation as the route is built. If the message does not arrive at the destination node, the source node has the option of releasing the reserved channels by dropping MSGREQ. MSGREQ follows the same path as the message through the MRC. It routes directly through selectors in the MRC as they are enabled along the route. This effectively reserves the path through the MRC. MSGREQ is dropped in acknowledgment of the falling transition of MSGACK.

MSGACK follows the same path as the message through the MRC except in the opposite direction. MSGACK originates at the destination NIC. The purpose of MSGACK is three-fold. First, it is used to signal to the source node that the header of the message has arrived at the destination node. Second, it will signal to the source node that the destination node has received the last word of the message. Third, it controls the releasing of all channels along the path from the destination towards the source along the route and provides a reference edge that allows the source node to sample MSGERROR. The MSGACK and MSGERROR signals are routed directly through MRC selectors.

MSGERROR is routed from the destination back to the source after the message is routed. MSGERROR originates at the destination NIC. MSGERROR is used to signal whether the end of message was received at the destination without error. In the case that the message was received corrupted it can also notify the source that the message should be retransmitted. If an error is detected, MSGERROR will assert immediately at the destination NIC. It will remain active until after the source NIC de-asserts MSGREQ.

The MRC will logically "OR" together MSGREQ and MSGACK and use this signal to allow the internal and external channels to remain reserved. If both signals are low, the selectors along the route are reset and all data storage registers along the route are reset to the "empty" condition.

This effectively releases the route. If either signal is high and a header has been loaded, the channels remain reserved.

Instead of each MRC having control over when it releases its' reserved channels (via the tail bit), the destination and source nodes now control this function with the MSGREQ and MSGACK signals. This allows the source and destination hardware or software to release any seized channels after an appropriate time-out or if other error indications are detected.

It is no longer necessary for the MRCs to know when the end of the message occurs. In fact, it is this very knowledge that creates the seizure phenomenon. Instead, the destination hardware (NIC component) will load a message length counter from data contained in the message header. The NIC will then detect the end of the message and be responsible for changing the state of the MSGACK line that allows the release of all reserved channels of the route. If the software wishes to intervene because of a time-out waiting for the end of a message, it can override the NIC and cause the MSGACK line to change state and reset the message length counter. Processor intervention can remain limited to controlling the NIC which is much more convenient and logical than trying to control the MRCs.

MSGERROR can be asserted whenever the destination requires that the packet be re-transmitted. The same mechanism that signals the source to re-try when the message was corrupted can be used to force a re-try when an incomplete message was received.

Signal Protocol

Figure 10:
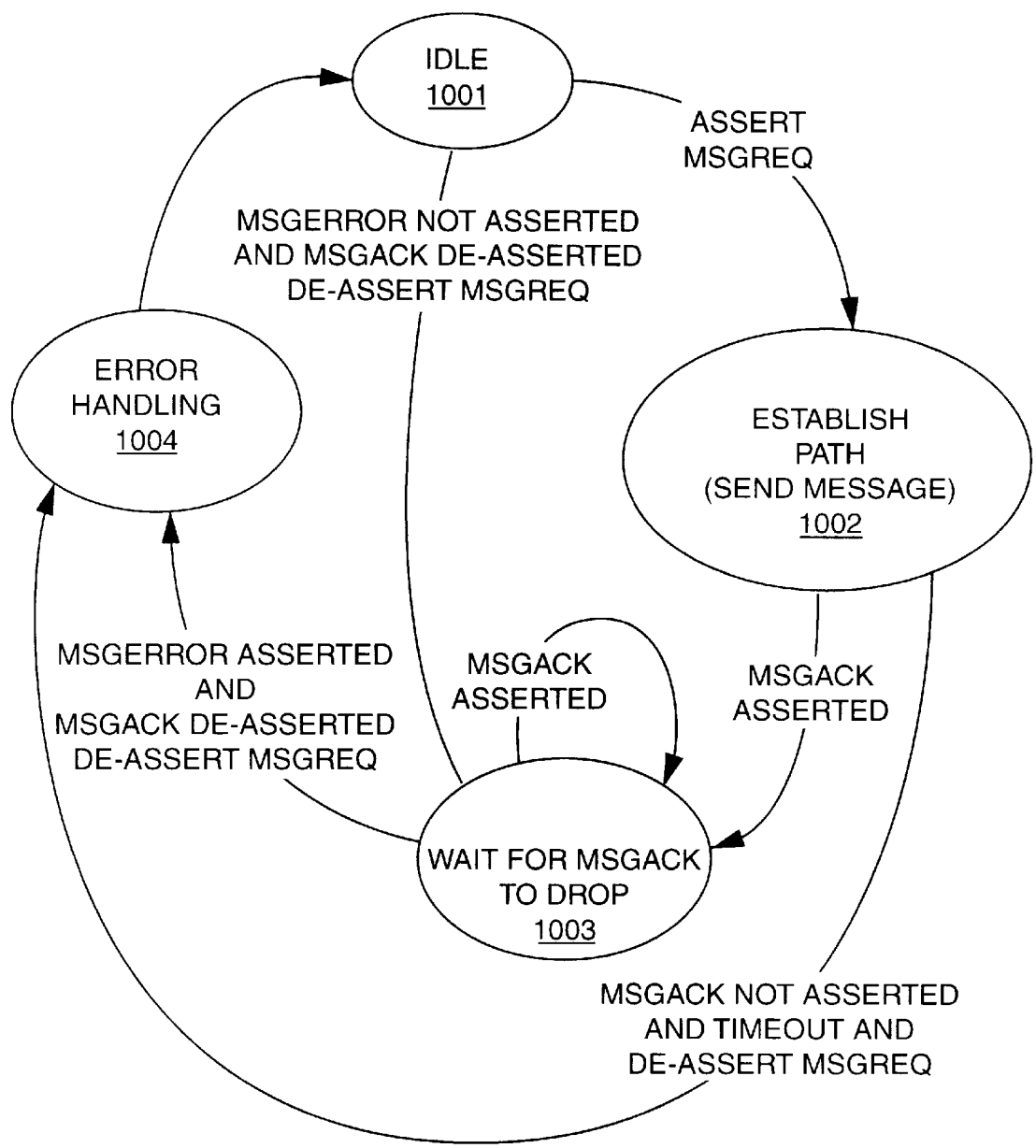
FIG. 10 is a state diagram for operation of a routing element as a source node in the currently preferred embodiment of the present invention.

FIGS. 10–13 illustrate the protocol used by the MSGREQ, MSGACK and MSGERROR signals. FIG. 10 is a state diagram illustrating the protocol of the currently preferred embodiment of the present invention when embodied within a NIC operating as a source node. The source node is initially in an idle state 1001. When a message is transmitted, the MSGREQ signal is asserted and an establish path state 1002 is entered. When in the establish path state 1002, the message is being sent to the destination node. The driver remains in state 1002 until 1) MSGACK is asserted or 2) MSGACK is not asserted within a predetermine time (i.e. a time-out). Assertion of MSGACK will be described in more detail below with respect to a destination node. If MSGACK is asserted within a predetermined time, a Wait for MSGACK to drop state 1003 is entered. The NIC remains in state 1003 so long as MSGACK is asserted. If MSGERROR does not become asserted and MSGACK is de-asserted, MSGREQ is de-asserted and idle state 1001 is entered.

IF MSGERROR is asserted and MSGACK has been de-asserted, MSGREQ is de-asserted and error handling state 1004 is entered. The error handling state 1004 may also be entered from the establish path state 1002. This occurs if MSGACK is not asserted within a predetermined time. In this instance MSGREQ is de-asserted and error handling state 1004 is entered. In error handling state 1004, the NIC may perform various error handling routines such as initiating re-transmission of the message or performing error analysis. As will be described in more detail below, the MSGERROR signal is asserted by the destination node. After the error handling routine has been performed, the idle state 1001 is entered.

Figure 11:
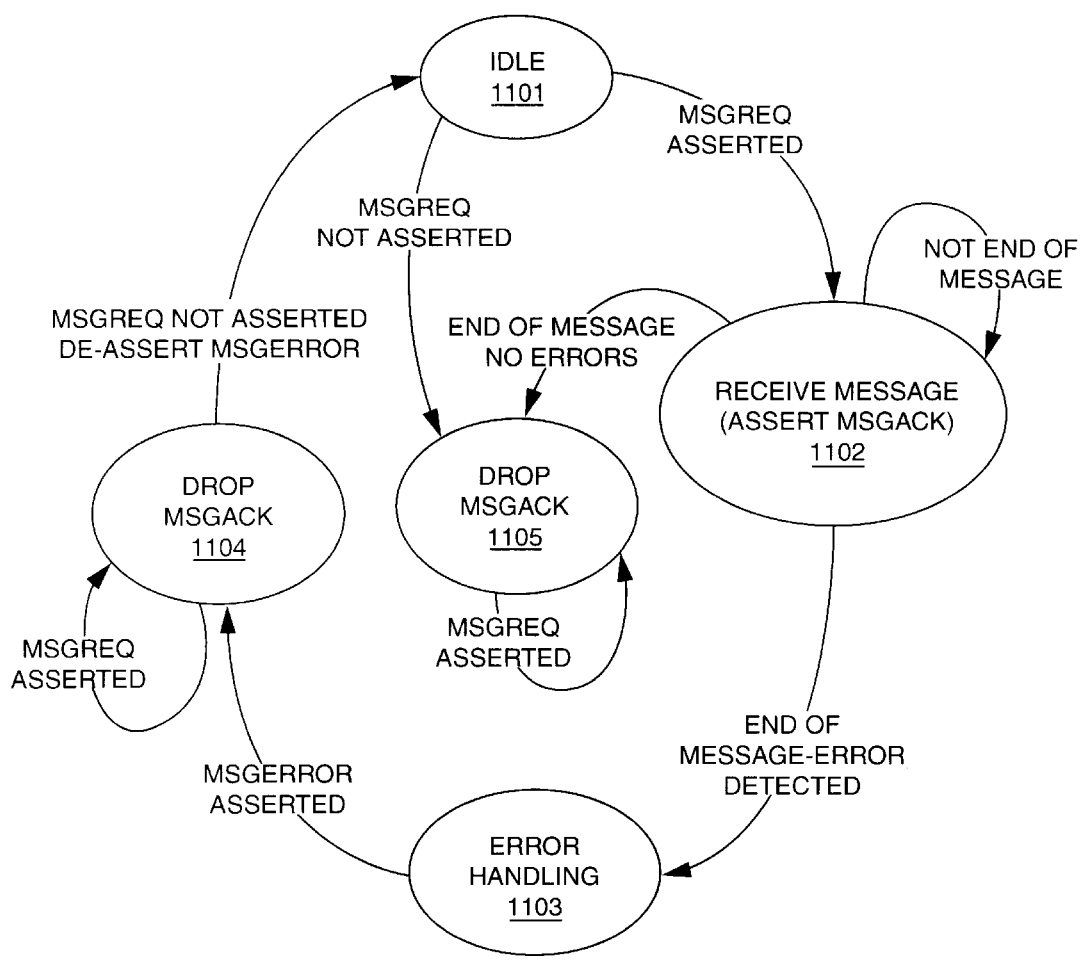
FIG. 11 is a state diagram for the operation of a routing element as a destination node in the currently preferred embodiment of the present invention.

FIG. 11 is a state diagram illustrating the protocol of the currently preferred embodiment of the present invention as embodied within a NIC operating as a destination node. The destination node is initially in the idle state 1101. When the first bit of a message is received the MSGREQ is asserted and a receive message state 1102 is entered. The destination node remains in the receive message state 1102 until the message is completed. If the entire message is received without error, a drop MSGACK state 1105 is entered. When in this state MSGACK is de-asserted. The destination node remains in this state so long as MSGREQ is asserted. WHEN MSGACK is no longer asserted, the idle state 1101 is entered.

Referring back to receive message state 1102, if the end of message is received and an error is detected, error handling state is entered. In the error handling state 1103, MSGERROR is asserted and any desired error handling routines are performed. Such an error handling routine may be to purge the received message. When MSGERROR is asserted, a drop MSGACK state 1104 is entered. In drop MSGACK state 1104, the destination node will de-assert MSGACK. The destination node will remain in state 1104 so long as MSGREQ is asserted. When MSGREQ is de-asserted by the source node, MSGERROR will be de-asserted. At this point the destination node will enter idle state 1101.

Figure 12:
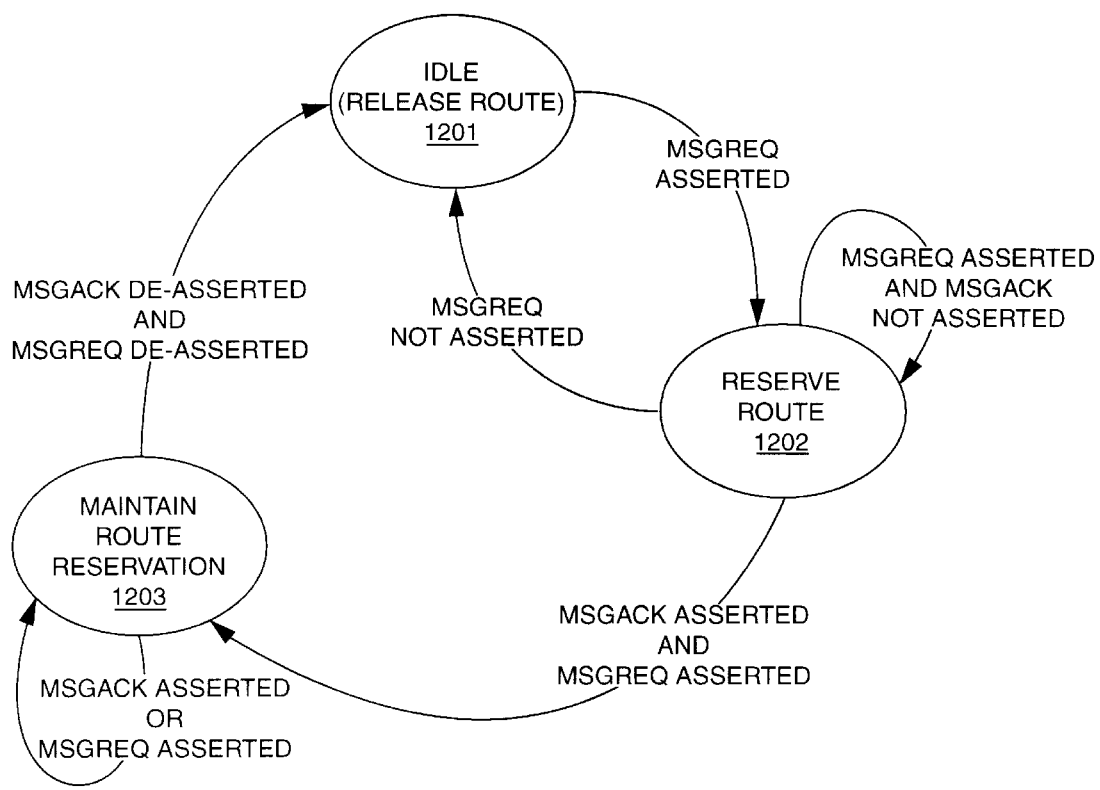
FIG. 12 is a state diagram for the operation of an intermediate node in a path between a source node and destination node in the currently preferred embodiment of the present invention.

FIG. 12 is a state diagram illustrating the protocol of the currently preferred embodiment of the present invention as embodied within an MRC. This operation refers to the selectors of the MRC. In the currently preferred embodiment, this represents the states of the selector controls. The selector controls will monitor the MSGREQ and MSGACK signals. Initially, the intermediate node is in the idle state 1201. When in the idle state 1201, routes are released. When MSGREQ is detected as asserted a reserve route state 1202 is entered. This will reserve as particular route for a particular message transmission. Other routes within the MRC would remain released. The intermediate node remains in the reserve route 1202 state so long as MSGREQ is asserted MSGACK is not asserted. If MSGREQ becomes de-asserted while the intermediate node is in reserve route state 1202, a time-out has occurred. The intermediate node would then enter the idle state 1201 where the route is released.

While in reserve route state 1202, if MSGACK becomes asserted, maintain route reservation state 1203 is entered. While in the state 1203, the route is reserved for message transmission. The intermediate node will remain in the state 1203 so long as MSGACK or MSGREQ is asserted. When MSGACK and MSGREQ are both de-asserted, the intermediate node will enter the idle state 1201. Thus, the route will be released for further use.

It should be noted that a node may simultaneously be a source, destination and intermediate node, or any combination thereof. A node may act as a destination node for multiple message transmissions. This is due to the reservation of specific routes. So for example a route going from a west in to a west out would not have to reserve other routes that would utilize west out, e.g. east in to east out or east in to south out. Finally, a node may concurrently be a destination node for multiple message transmissions.

Signal Timing

Figure 13:
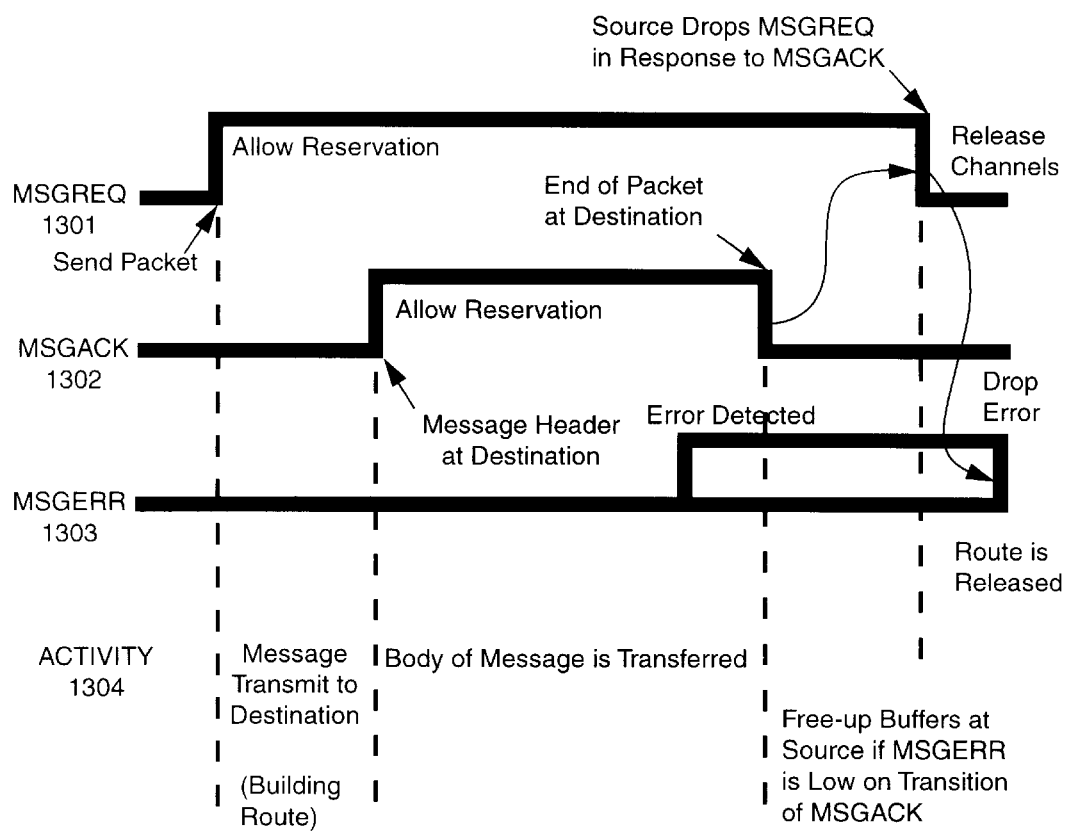
FIG. 13 is a timing diagram of the channel signals of the currently preferred embodiment of the present invention.

FIG. 13 is a timing diagram which further illustrates the use of the MSGREQ, MSGACK and MSGERROR control signal protocol. referring to FIG. 13, the MSGREQ is asserted, i.e. it is set high when a message is being sent. While the MSGREQ is high, the various channels in the route are sequentially reserved. Some delay will occur from the time that the message is sent from the source node to the destination node. When the messages is received by the destination node, the MSGACK signal 1302 is asserted. It is asserted as soon as the message header is received at the destination node. Through this point the MSGACK signal is set high and it can be used as an indicator by a source node to indicate that the message route has been built and that the header has been received by the destination node. When the end of the message is received, the MSGACK 1302 is de-asserted by the destination node. Again some delay will occur between the time the MSGACK is de-asserted and it is received by the source node. Note that the de-assertion of the MSGACK will also signal to the source node that the entire message has been received. In any event, MSGREQ will be de-asserted as soon as it is detected that MSGACK is de-asserted.

The MSGERROR may be asserted by the destination node 1303 whenever an error is detected. When MSGERROR is detected by the source node, the MSGREQ signal is de-asserted. This will cause all MRCs to release the channels (routes) reserved for this message. When the destination node detects that the MSGREQ signal is de-asserted, the MSGERROR will also be de-asserted.

Error Handling and System Recovery

The present invention allows for both detection of error conditions, and a means for releasing MRCs when an error occurs.

While the present invention provides a way to release reserved nodes when an error is detected, other means for recovery have not been described in detail. Such procedures for recovery would depend on the nature of the error and of the application. A simple error recovery technique may be to simply re-transmit the message. This would require that the source node retain the message until an acknowledgment is received.

Performance Implications

Because the route is reserved until the end of the message reaches the destination, this appears to add latency to the message. In reality, it only appears to be a longer message (by the transit time of the un-reserved route) to the source and the network. The message latency is not any greater as experienced by the destination.

Since the reserved channels are held by the MSGACK signal controlled by the destination NIC, MSGACK must propagate back to the source NIC before the next message can be sent. MSGREQ is then de-asserted which propagates down the route to the destination releasing channels as it goes. These signals are truly "circuit switched" and will incur a minimum propagation delay through each route. There is no state stored in the MRCs' along the path of these signals. They are entirely combinatorial.

If the message buffer at the source is reserved until the acknowledgment from the destination, this may also impact performance. The message buffer will remain reserved for an additional time equal to ½ the message transit time (uncongested plus the MSGACK propagation time).

If the message buffer is in the NIC chip, the software at the source may experience additional latency if and when the FIFO buffer in the NIC fills up.

In an alternative embodiment, the message buffer is reserved in memory in the processing system that the NIC interfaces with. This will impact performance to a greater extent. The de-allocation of the memory partition will be deferred and the node software will have to poll the MSGACK line to know when to release it.

The present invention provides a way to guarantee delivery of packets without incurring large latency penalties and allows the network to recover from failures, hard and soft, that would otherwise seize the network and require a system re-boot. In addition, it provides a convenient way to diagnose network failures. Once a hard network failure is diagnosed, the forwarding ability of the NIC might be used to achieve a level of adaptive routing.

Thus, a method and apparatus for reserving and releasing message routes in a parallel processing computer system, is disclosed.

I claim:

1. A multi-processor computer system having a plurality of interconnected computing nodes comprising:

a) a processor;

b) a network interface element coupled to said processor and a routing element, said network interface element for buffering a message between said processor and other computing nodes, said network interface element comprised of:

a message storage means for storing incoming messages to said processor and outgoing messages to said other computing nodes;

a message request line for reserving a route between said processor and said other computing node during the transmission of a message;

a message acknowledge line for transmitting and receiving a message acknowledge signal;

an error detector;

a message error line for transmitting and receiving an error signal from said other computing node back to said processor, wherein said message error line is asserted when said error detector detects an error in the transmission of said message and the message request line is de-asserted when the message error line is asserted, such that the route between the processor and the other node is released;

wherein said message acknowledge line is asserted when the beginning of a message is received and de-asserted when the entirety of said message has been received, wherein said message request line is asserted upon transmission of a message and de-asserted when said message acknowledge line is de-asserted, and wherein the de-assertion of said message request line releases said route between said processor and said other computing node; and c) a routing element for routing messages between computing nodes, said routing element comprised of:

a plurality of channels to said other computing nodes, each of said plurality of channels including means for receiving and transmitting said message request, message acknowledge, and message error lines;

means for reserving a channel to a neighboring computing node responsive to the value of said message request and message acknowledge lines; and means for storing and transmitting said message from said processor to said other computing nodes.

2. The multi-processor computer system as recited in claim 1 wherein said routing element is further comprised of:

means for reserving one of said plurality of channels to neighboring computing nodes responsive to an asserted message request signal; and means for releasing said channel responsive to a de-asserted message request signal and a de-asserted message acknowledge signal.

3. A method for reserving and releasing a route for a message in a multi-processor computer system, said multi-processor computer system comprised of a plurality of interconnected computing nodes, each of said computing nodes having a plurality of channels for transmitting messages to a neighboring node, said method comprising:

generating a message packet for a destination computing node from a source computing node;

said source node asserting a message request signal to reserve one or more channels leading to said destination node;

said destination node asserting an acknowledgment signal when said message arrives; said destination node determining that a transmission error has occurred;

said destination node asserting an error signal;

said destination node de-asserting said acknowledgment signal when said message is completely received;

said source node receiving and detecting said error signal;

said source node identifying a corrective course of action;

said source node de-asserting said message request signal to release said channel;

said source node re-transmitting said message to said destination node;

said destination node de-asserting said acknowledgment signal when said message is completely received; and said source node de-asserting said message request signal to release said channel reserved by said source node.

4. The method as recited in claim 3 wherein said source node asserting a message request signal to reserve one or more channels leading to said destination node further comprises:

receiving said message request signal at a first intermediate node;

determining a channel for transmitting said message from said first intermediate node to said destination node;

reserving said channel;

transmitting said message request signal to the next intermediate node;

repeating receiving through transmitting at any other intermediate nodes until said message request signal is received by said destination node; and sending said message to said destination node through said reserved channel.

5. The method as recited in claim 4 wherein prior to said destination node asserting an acknowledgement signal when said message arrives performing:

said source node detecting a predetermined period of time elapsing without receipt of an acknowledgment signal;

said source node de-asserting said message request signal; and said first intermediate node and said any other intermediate nodes releasing said channel associated with said message request signal.

6. The method of claim 5 further comprising said source node retransmitting said message.

7. A computer system comprising:

a plurality of processing elements coupled to a networking means; said networking means comprised of a plurality of routing means, each of said plurality of routing means for routing messages to processing elements coupled to said networking means, wherein each of said plurality of processing elements comprises:

a plurality of couplings to said plurality of routing means, wherein said plurality of couplings includes:

a message request line, a message acknowledge line, and an error line, means for reserving an associated one of said plurality of couplings;

means for releasing an associated one of said plurality of couplings; and error detection means for detecting an error condition requiring the release of an associated one of said plurality of couplings, said error detection means coupled to said means for releasing an associated one of said plurality of couplings.

8. The computer system as recited in claim 7 wherein each of said plurality of processing elements further comprises:

means for asserting said message request line upon transmission of a message;

means for asserting said message acknowledge line upon receipt of the beginning of the transmission of a message;

means for de-asserting said message acknowledge line upon receipt of the entire message; and means for de-asserting said message request line upon detection that said message acknowledge line has been de-asserted.

9. The computer system as recited in claim 8 wherein said means for reserving an associated one of said plurality of couplings is further comprised of:

means for determining which of said associated one of said plurality of couplings is to be reserved;

means for detecting that said message request line is asserted or de-asserted;

means for detecting that said message acknowledgment line is asserted or de-asserted; and means for reserving said associated one of said plurality of couplings responsive to said message request line being asserted or said message acknowledge line being asserted.

10. The computer system as recited in claim 9 wherein said means for releasing an associated one of said plurality of couplings is comprised of:

means for determining that said message request line and said message acknowledge line have been de-asserted; and means for releasing the coupling for which said message request line and said message acknowledge line have been de-asserted.

11. The computer system as recited in claim 10 wherein said error detection means is further comprised of:

means for determining that an error in the transmission of a message has occurred; and means for asserting said error line.

12. The computer system as recited in claim 11 wherein said error detection means is further comprised of means for detecting that a predetermined period of time after said message request line has been asserted, has passed without said message acknowledge line being asserted.

* * * * *